(12) United States Patent
Omata et al.

(10) Patent No.: US 8,056,603 B2
(45) Date of Patent: Nov. 15, 2011

(54) METHOD FOR PRODUCING CASTING DIE AND DIE MODEL

(75) Inventors: Seiji Omata, Tokyo (JP); Toshio Iwasawa, Kanagawa (JP)

(73) Assignees: Kamiita Seiki Seisakusho Co., Ltd., Tokyo (JP); Mold Technical Office Co., Ltd., Naka-gun, Kanagawa (JP)

( * ) Notice: Subject to any disclaimer, the term of this patent is extended or adjusted under 35 U.S.C. 154(b) by 311 days.

(21) Appl. No.: 12/443,892

(22) PCT Filed: Sep. 19, 2007

(86) PCT No.: PCT/JP2007/068120
§ 371 (c)(1),
(2), (4) Date: Apr. 1, 2009

(87) PCT Pub. No.: WO2008/050555
PCT Pub. Date: May 2, 2008

(65) Prior Publication Data
US 2010/0025002 A1    Feb. 4, 2010

(30) Foreign Application Priority Data
Oct. 23, 2006    (JP) .................................. 2006-287981

(51) Int. Cl.
B22C 7/02    (2006.01)
B22C 9/04    (2006.01)
B22D 46/00    (2006.01)
(52) U.S. Cl. .............................. 164/4.1; 164/34; 164/45
(58) Field of Classification Search .............. 164/34–36, 164/45, 4.1
See application file for complete search history.

(56) References Cited

U.S. PATENT DOCUMENTS

| 5,761,390 A | * | 6/1998 | Koshishiba et al. | .......... 700/250 |
| 2005/0200049 A1 | * | 9/2005 | Soejima | ........................ 264/442 |
| 2006/0157883 A1 | * | 7/2006 | Persson | .......................... 264/102 |

FOREIGN PATENT DOCUMENTS

| JP | 9-174556 | | 7/1997 |
| JP | 9-286030 | | 11/1997 |
| JP | 11-047880 | | 2/1999 |
| JP | 11-47880 | * | 2/1999 |
| JP | 2003-181596 | * | 7/2003 |

* cited by examiner

*Primary Examiner* — Kuang Lin
(74) *Attorney, Agent, or Firm* — McGlew and Tuttle, P.C.

(57) ABSTRACT

A method for producing a casting die by simple work without requiring any high work skill in which the working days required for producing the casting die can be shortened greatly. A die model suitably employed in this production method, an NC processing system and a processing robot are also provided. The method for producing the casting die comprises: (1) a die data making step for making die data through designing a requisite die in compliance with a configuration of an article to be produced; (2) an automatic processing preparation step for preparing processing data as to how processing is to be performed by an automatic processing machine on the basis of the die data; (3) a die model cutting step for producing a die model by cutting a die model material with the automatic processing machine; (4) a die mold making step for making a die mold by packing casting sand in a box whose upper side is open, with the die model produced in the die model cutting step being placed at a central part of the box, the casting sand being provided with a gate and solidified with bond to thereby obtain the die mold; (5) a die casting step for casting a die by pouring a molten die material into the die mold made in the die mold making step; and (6) a finishing and assembling step for finishing and assembling the die cast in the die casting step.

5 Claims, 9 Drawing Sheets

(a)

(b)

- 26 : Die mold
- 22 : Casting sand
- 28 : Molten metal (e.g., Aluminum)
- 24 : Gate
- 20
- 28 : Molten metal (e.g., Aluminum)

- 32 : Upper die
- 30 : Lower die

METHOD FOR PRODUCING CASTING DIE AND DIE MODEL

TECHNICAL FIELD

The present invention relates to a method for producing a casting die, in which a die model is prepared by using, for example, a plastic foam material such as a polyurethane foam material or a polystyrene foam material and in which a die is produced by casting with the die model, and a die model, an NC processing system, and a processing robot used in the producing method.

BACKGROUND ART

In the techniques related to automobiles, mass production is the mainstream. Recently, however, the vehicle types are varied, with model change being effected frequently. In this context, from the viewpoint of cost, delivery time, requisite precision, etc., die production through casting is widely performed to produce a die for forming a relatively large product of a plastic material to be used as an automobile interior component, for example, urethane padding (seat pad) for an automobile seat or the like.

As a method for producing such a die, a method including the following steps has been conventionally adopted:

(1) Master model body cutting step, in which a master model body is formed through manual processing or NC processing by using a synthetic resin type material such as polyurethane or polystyrene;

(2) Surface treating step, in which the surface of the formed master model body is treated to enhance the surface precision thereof;

(3) Master model making step, in which a master model is made by providing the master model with a flange, an auxiliary rib, a thick sheet which is for furnishing mold thickness, and others, so that the master model is used for producing a die by casting;

(4) Mold preparing step, in which a mold is prepared by packing sand by the use of the master model;

(5) Die casting step, in which a die is cast by pouring molten die material (e.g., aluminum alloy) into the mold; and (6) Finishing step, in which the casting die is finished by electric discharge machining or the like.

The above-mentioned conventional method requires a great number of working days. It takes approximately one month to obtain the die. In this context, a conventional improved method including the following steps has been proposed with a view to shortening the working days (Patent Document 1):

(1) Automatic processing preparation step, in which processing data in conformity with an article to be produced is prepared and inputted into an automatic processing machine (e.g., an NC machine) to record the data;

(2) Master model cutting and producing step, in which a master model is produced by cutting a master model body with an automatic processing machine;

(3) Sand mold preparation step, in which a sand mold is prepared by packing casting sand into the master mold placed in an outer frame and solidifying the sand to an appropriate hardness with bond;

(4) Die mold preparation step, in which a die mold is prepared by packing casting sand in the prepared sand mold, providing it with a gate, and solidifying the sand to an appropriate hardness by bond;

(5) Die casting step, in which a die is cast by pouring a predetermined molten die material (e.g., aluminum alloy) into the die mold; and (6) Finishing and assembling step, in which the casting die is finished and assembled.

In the above-mentioned die producing process in which the above-mentioned steps (1) through (6) are combined, the master model cutting and producing step is characterized in that the master model body is divided into several portions according to the degree to which the die is complicated, the several portions of the master model body are combined together again into an integral unit, and the integral unit is cut and processed.

DISCLOSURE OF THE INVENTION

Problem to be Solved by the Invention

Generally speaking, under the present circumstances, the configuration of the interior parts of an automobile is changed in a complicated manner, and each time such changes are made, old master models are disposed of, making it necessary to produce new master models one after another. Also in the above-mentioned improved method, the requisite number of working days is approximately two weeks, which is still disadvantageous from the economical point of view. Further, the workers are required to have a high level of working skill. That is, in this improved method, it is necessary to cut and process the master model which is formed of a synthetic resin type material such as polyurethane or polystyrene and divided into several portions. Further, after the casting sand packed in the mater model has been solidified, the master model is turned upside down, and is divided to be removed. After that, there is provided a thick mat which has the same thickness as that of the die and is formed of a meltable material. As described above, the preparation of the die mold requires time and skilled working capacity.

The present invention has been made in view of the above-mentioned problems in the prior art. It is an object of the present invention to provide a method for producing a casting die which helps to substantially reduce the requisite working days for producing a casting die and which allows production of a casting die through a simple operation without requiring any highly sophisticated skill, a die model suitably employed in this method, an NC processing system, and a processing robot.

Means for Solving the Problems

In order to solve the above-mentioned problem, a first aspect of the present invention provides a method for producing a casting die including:

(1) a die data making step for making die data through designing a requisite die in compliance with a configuration of an article to be produced;

(2) an automatic processing preparation step for preparing processing data as to how processing is to be performed by an automatic processing machine on the basis of the die data;

(3) a die model cutting step for producing a die model by cutting a die model material with the automatic processing machine;

(4) a die mold making step for making a die mold by packing casting sand in a box whose upper side is open, with the die model produced in the die model cutting step being placed at the central part of the box, the casting sand being provided with a gate and solidified with bond to thereby obtain the die mold;

(5) a die casting step for casting a die by pouring a molten die material into the die mold made in the die mold making step; and (6) a finishing and assembling step for finishing and assembling the die cast in the die casting step.

As the material of the die model, there is used a synthetic resin material. As the synthetic resin material, a plastic foam material is preferable; for example, it is particularly preferable to employ a plastic foam material, for example, a polyurethane foam material such as a soft polyurethane foam material or a hard polyurethane foam material, and a polystyrene foam material. As the die material, there is suitably used aluminum alloy.

In the case in which aluminum alloy is used as the die material, the polyurethane foam material or hard urethane foam material is not evaporated at the melting temperature of the aluminum alloy (700 to 750° C.), and does not undergo displacement vanishing (evaporation vanishing) even when molten aluminum alloy is poured in. The polystyrene foam material is evaporated and undergoes displacement vanishing (evaporation vanishing) due to the molten aluminum alloy.

It is desirable that the article is an automobile seat pad. That is, the casting die producing method is suitably used for the production of an automobile seat pad.

As the automatic processing machine, an NC machine or a processing robot, for example, is applicable.

Further, a second aspect of the present invention provides a method for producing a casting die, further including (2A) a robot data conversion step for converting the processing data into robot operation data after the automatic processing preparation step, wherein the automatic processing machine is a processing robot.

That is, the method for producing a casting die according to the second aspect of the present invention includes:

(1) a die data making step for making die data through designing a requisite die in compliance with a configuration of an article to be produced;

(2) an automatic processing preparation step for preparing processing data as to how processing is to be performed by an automatic processing machine on the basis of the die data;

(2A) a robot data conversion step for converting the processing data into robot operation data;

(3) a die model cutting step for producing a die model by cutting a die model material with the automatic processing machine;

(4) a die mold making step for making a die mold by packing casting sand in a box whose upper side is open, with the die model produced in the die model cutting step being placed at the central part of the box, the casting sand being provided with a gate and solidified with bond to thereby obtain the die mold;

(5) a die casting step for casting a die by pouring a molten die material into the die mold made in the die mold making step; and (6) a finishing and assembling step for finishing and assembling the die cast in the die casting step.

In the case of the casting die producing method according to the second aspect, a processing robot is applied as the automatic processing machine.

An NC processing system of the present invention is an NC processing system used in a method for producing a casting die according to the second aspect, which includes:

a CAD apparatus for preparing the die data and processing data;

a robot data converting apparatus for converting the prepared processing data into robot operation data; and a processing robot for performing cutting of a die model.

A die model of the present invention is a die model used in a method for producing a casting die according to the present invention, wherein processing data as to how processing is to be performed by an automatic processing machine are prepared on the basis of die data and wherein the die model is produced by cutting a die model material formed of a synthetic resin material with the automatic processing machine on the basis of the processing data.

Effects of the Invention

According to the casting die producing method of the present invention, it is possible to substantially shorten the requisite working days for producing a casting die, and to produce a casting die through a simple operation without requiring any highly sophisticated working skill. Further, the die model of the present invention is suitably applicable to the method of the present invention.

DESCRIPTION OF REFERENCE SYMBOLS

10: lower die data, 12: upper die data, 14A, 14B: an automatic processing machine, 16: a die model material, 18: a die model, 18a: an inner surface, 18b: an outer surface, 20: a box, 22: casting sand, 24: a gate, 26: a die mold, 28: a molten die material, molten metal, 30: a lower die, 32: an upper die, 34: a hollow portion, 36: a processing robot, 38: a multi-axis arm, 40: a drill, 42: a placing stand, 44: an NC processing system, 46: a CAD apparatus, 48: a robot data converting apparatus, 50: a CAM data import apparatus.

BEST MODE FOR CARRYING OUT THE INVENTION

In the following, an embodiment of the present invention is described with reference to the accompanying drawings. The illustrated example is a preferred embodiment of the present invention, and it is needless to say that various modifications are possible without departing from the technical idea of the present invention.

Figure 1:
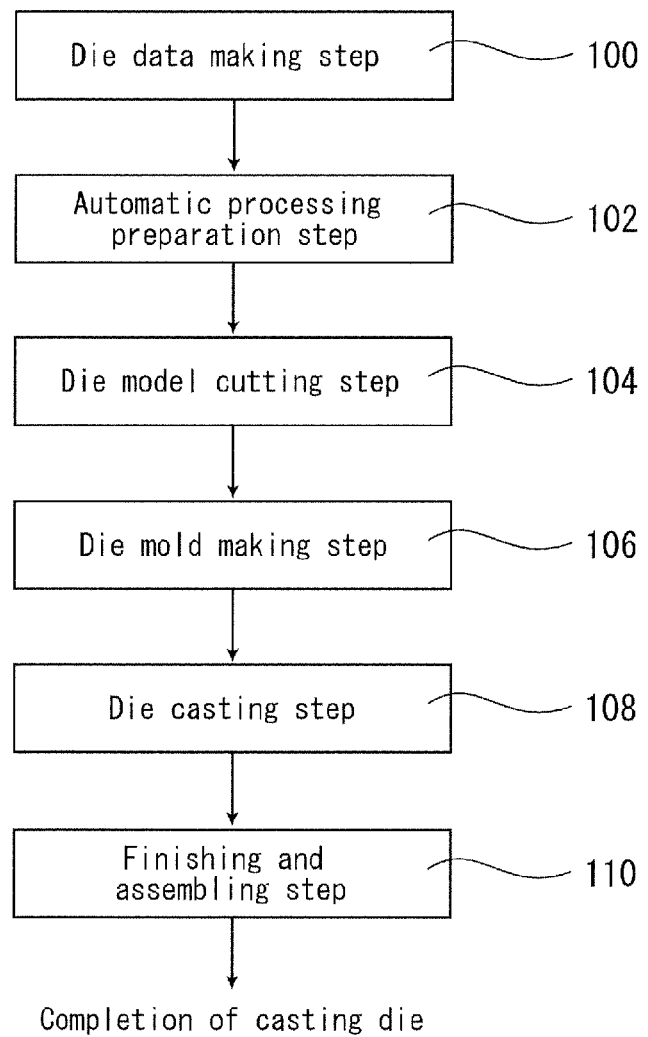
FIG. 1 is a flowchart illustrating a step order in the casting die producing method according to a first aspect of the present invention.
Figure 2:
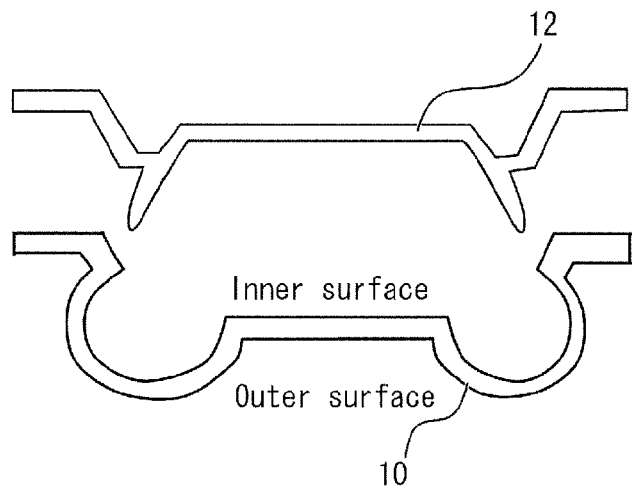
FIG. 2 is a diagram illustrating data of a die (a lower die portion and an upper die portion) in conformity with an article configuration.
Figure 3:
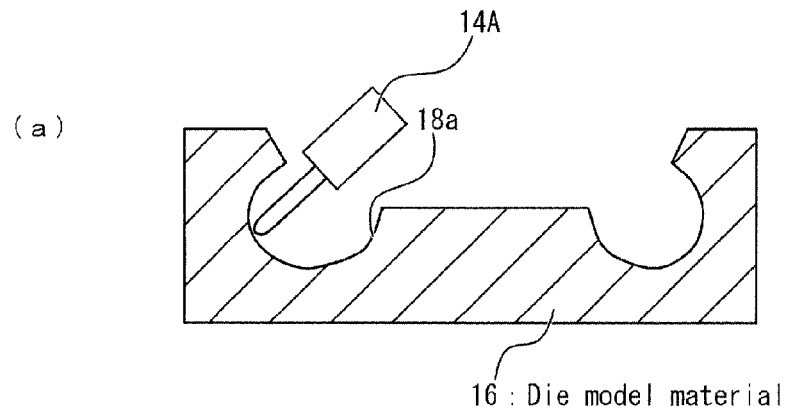
FIG. 3 is an explanatory sectional view illustrating a state where a die model material is cut by an automatic processing machine; the portion (a) illustrates a state where the inner surface side of the die model is cut, and the portion (b) illustrates a state where the outer surface of the die model is cut.
Figure 3:
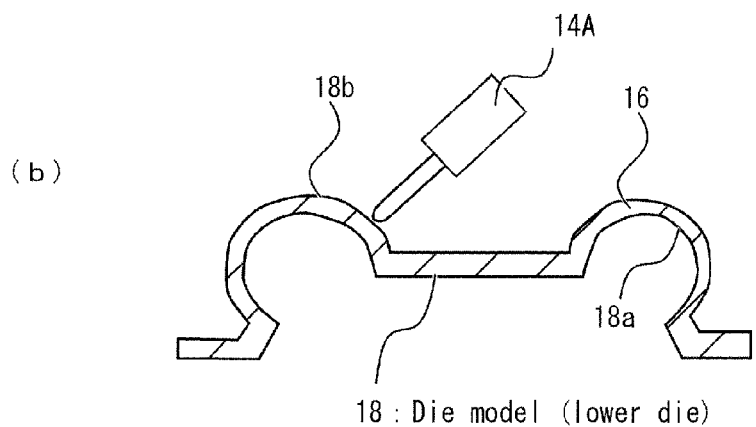
Figure 4:
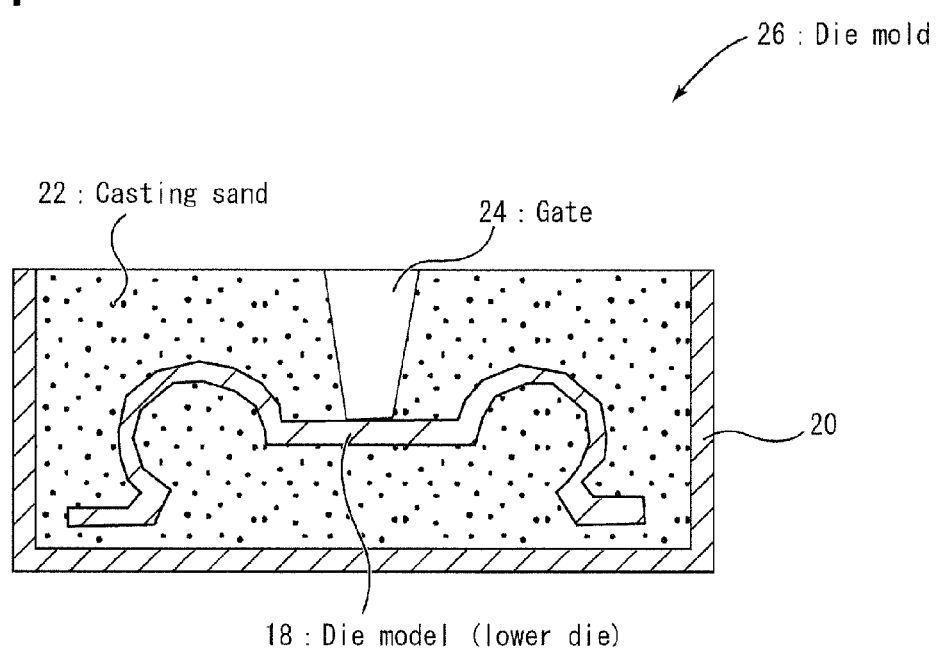
FIG. 4 is an explanatory sectional view illustrating a state where the die model is placed at the central part of a box whose upper side is open, with the box being packed with casting sand, a gate being provided to form a die mold through solidification with bond.
Figure 5:
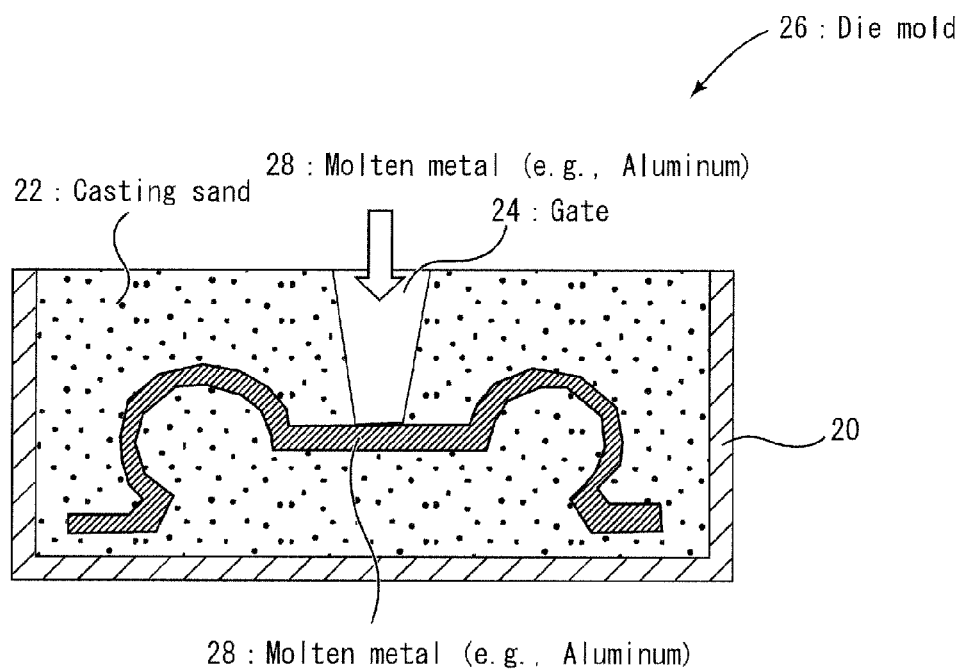
FIG. 5 is an explanatory sectional view illustrating a state where molten metal is poured into the die mold of FIG. 4 via the gate.
Figure 6:
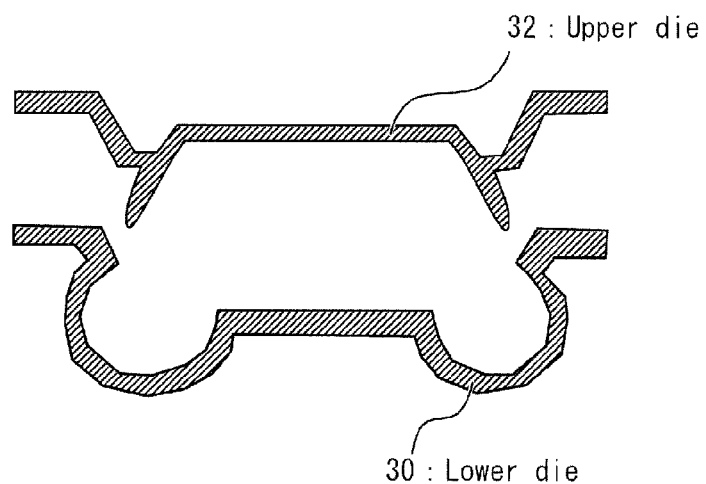
FIG. 6 is an explanatory sectional view of the cast die (the lower die portion and the upper die portion).

FIG. 1 is a flowchart illustrating a step order in the casting die producing method according to a first aspect of the present invention. FIG. 2 is a diagram illustrating data of a die (a lower die portion and an upper die portion) in conformity with an article configuration. FIG. 3 is an explanatory sectional view illustrating a state where a die model material is cut by an automatic processing machine; the portion (a) illustrates a state where the inner surface side of the die model is cut, and the portion (b) illustrates a state where the outer surface of the die model is cut. FIG. 4 is an explanatory sectional view illustrating a state where the die model cut in FIG. 3 is placed at the central part of a box whose upper side is open, with the box being packed with casting sand, a gate being provided to form a die mold through solidification with bond. FIG. 5 is an explanatory sectional view illustrating a state where molten metal is poured into the die mold of FIG. 4 via the gate. FIG. 6 is an explanatory sectional view of the cast die (the lower die portion and the upper die portion).

Figure 7:
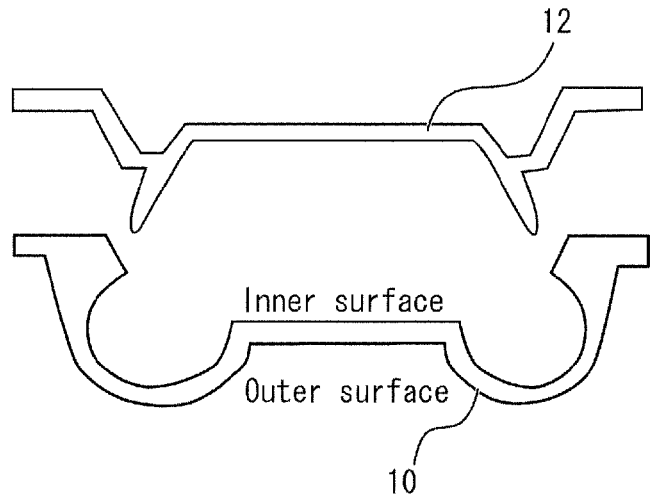
FIG. 7 is a diagram illustrating another example of the die data (the lower die data and the upper die data) in conformity with an article configuration.
Figure 8:
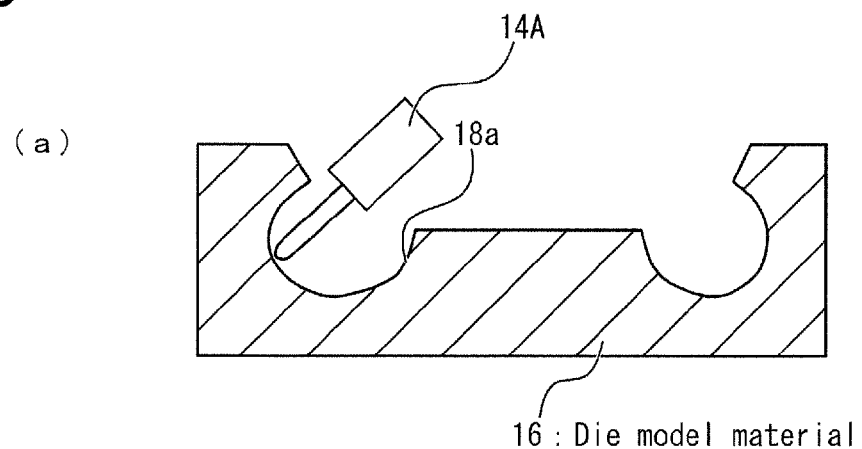
FIG. 8 is an explanatory sectional view illustrating a state where a die model material is cut by an automatic processing machine on the basis of the die data of FIG. 7; the portion (a) illustrates a state where the inner surface side of the die model is cut, and the portion (b) illustrates a state where the outer surface of the die model is cut.
Figure 8:
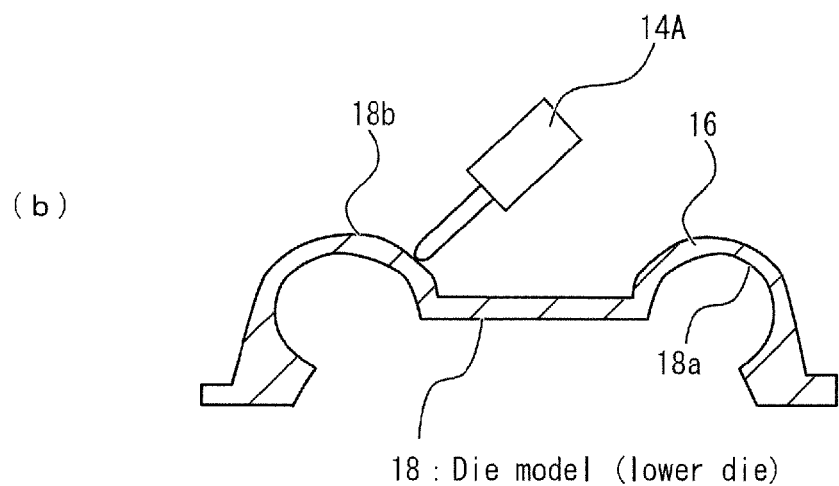
Figure 9:
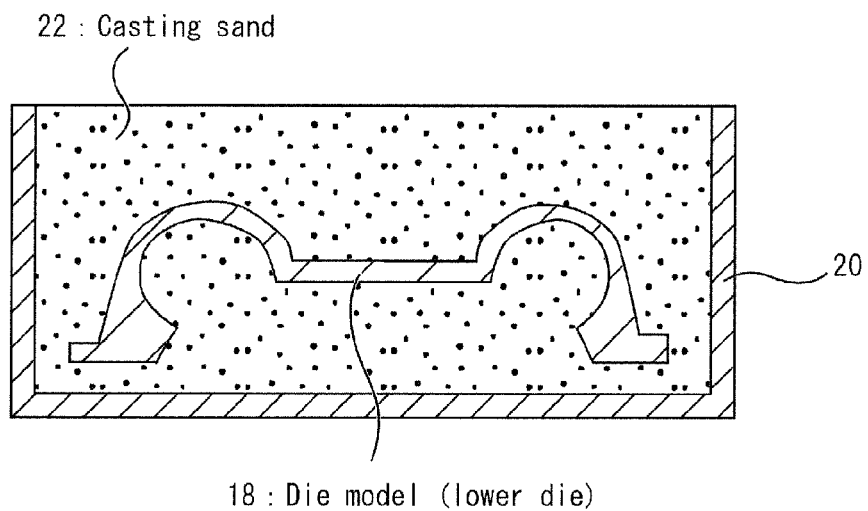
FIG. 9 is an explanatory sectional view illustrating a state where the die model cut as illustrated in FIG. 8 is placed at the central part of a box whose upper side is open, with the box being packed with casting sand.
Figure 10:
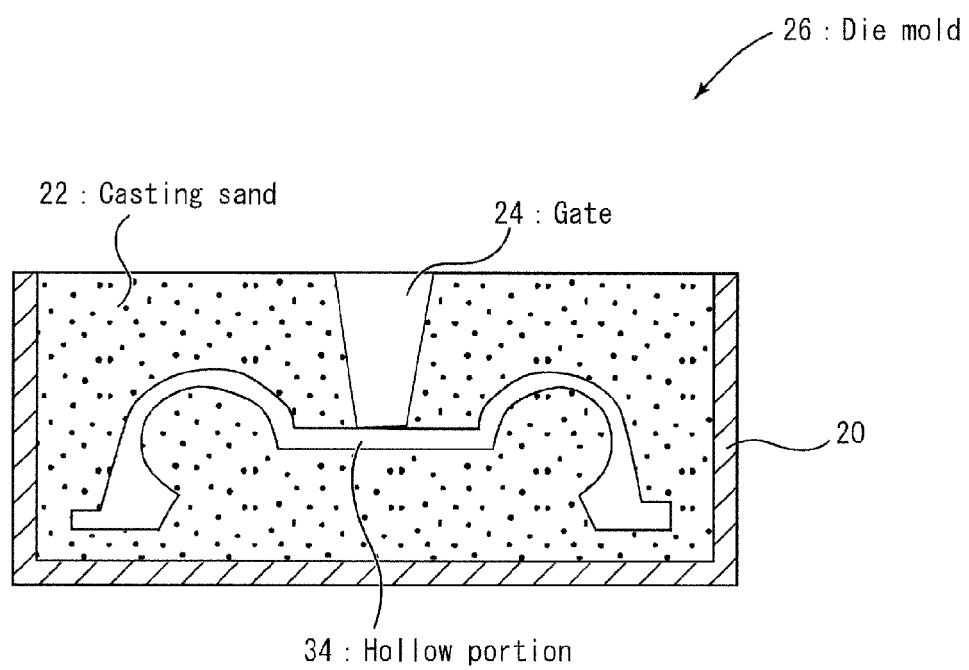
FIG. 10 is an explanatory sectional view illustrating a state where the die model is taken out from the box of FIG. 9 in which casting sand is packed and a gate is provided to form a die mold.
Figure 11:
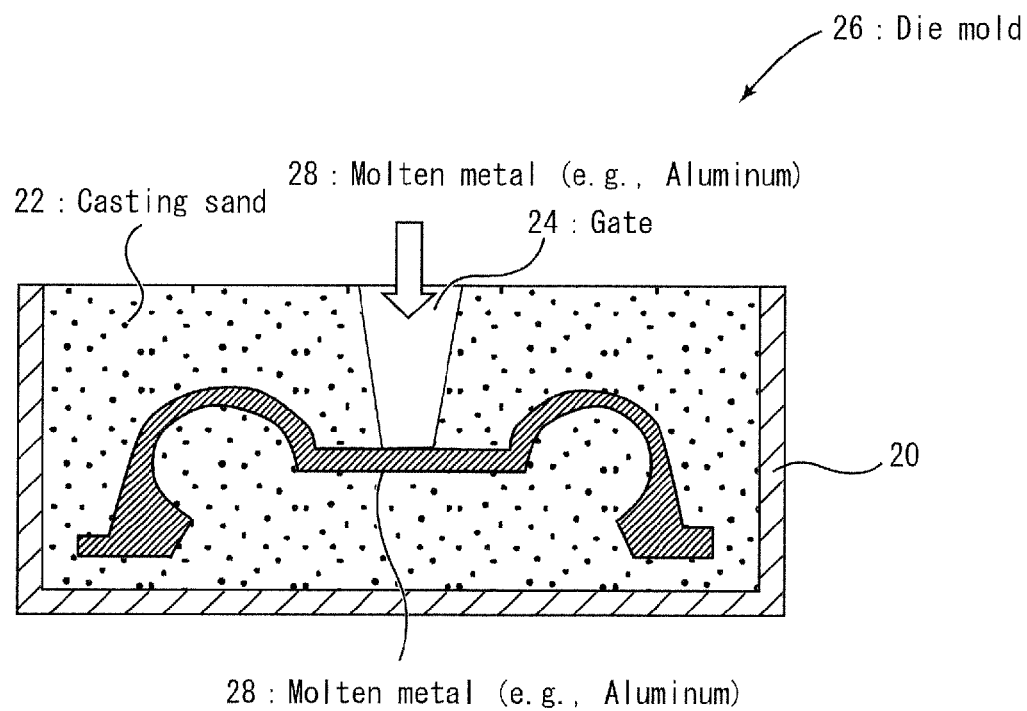
FIG. 11 is an explanatory sectional view illustrating a state where molten metal is poured into the die mold of FIG. 10 via the gate.
Figure 12:
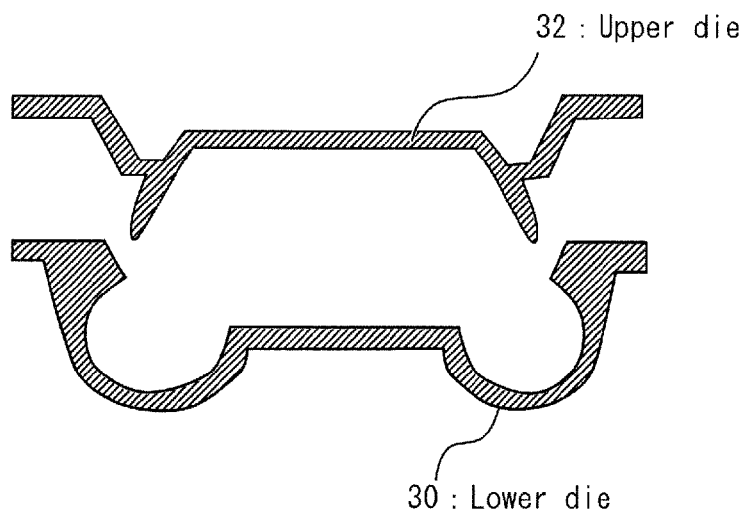
FIG. 12 is an explanatory sectional view illustrating the cast die (the lower cast die and the upper cast die) as illustrated in FIG. 11.

FIG. 7 is a diagram illustrating another example of the die data (the lower die data and the upper die data) in conformity with an article configuration. FIG. 8 is an explanatory sectional view illustrating a state where a die model material is cut by an automatic processing machine on the basis of the die data of FIG. 7; the portion (a) illustrates a state where the inner surface side of the die model is cut, and the portion (b) illustrates a state where the outer surface of the die model is cut. FIG. 9 is an explanatory sectional view illustrating a state where the die model cut as illustrated in FIG. 8 is placed at the central part of a box whose upper side is open, with the box being packed with casting sand. FIG. 10 is an explanatory sectional view illustrating a state where the die model is taken out from the box of FIG. 9 in which casting sand is packed and a gate is provided to form a die mold. FIG. 11 is an explanatory sectional view illustrating a state where molten metal is poured into the die mold of FIG. 10 via the gate. FIG. 12 is an explanatory sectional view illustrating the cast die (the lower cast die and the upper cast die) as illustrated in FIG. 11.

Figure 13:
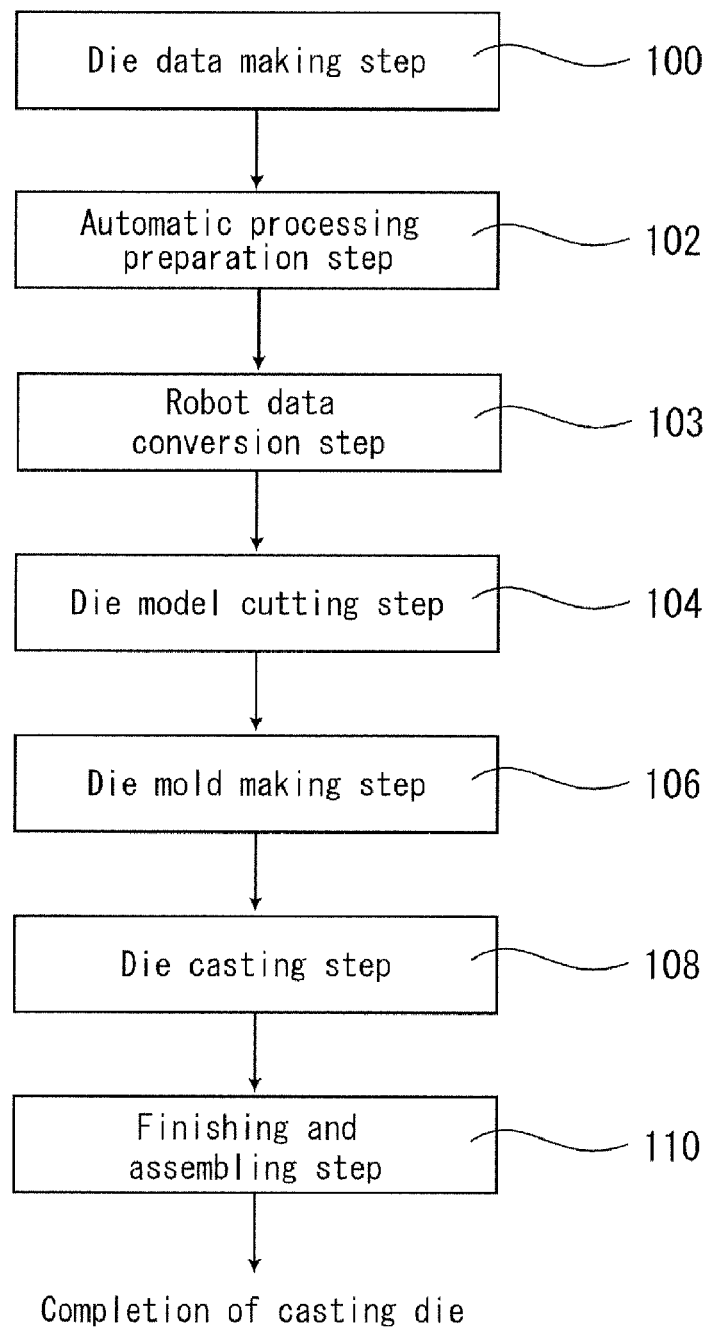
FIG. 13 is a flowchart illustrating a step order in the casting die producing method according to a second aspect of the present invention.
Figure 14:
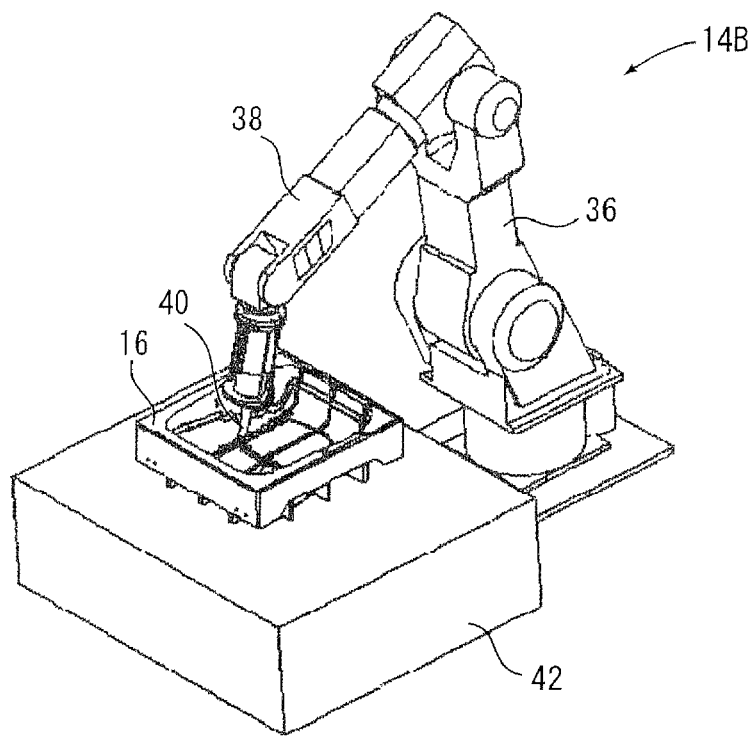
FIG. 14 is a perspective view of an embodiment of a processing robot used in the casting die producing method of the present invention.
Figure 15:
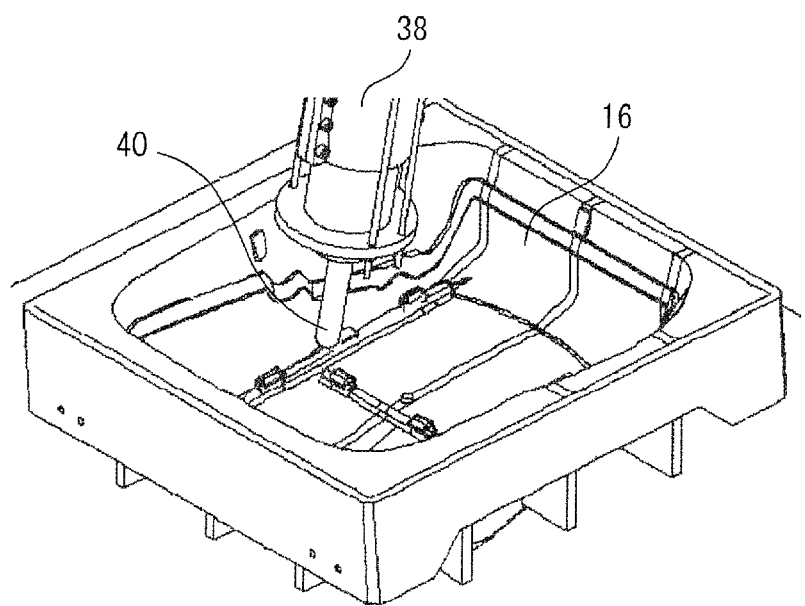
FIG. 15 is an enlarged sectional view of an essential portion of FIG. 14.
Figure 16:
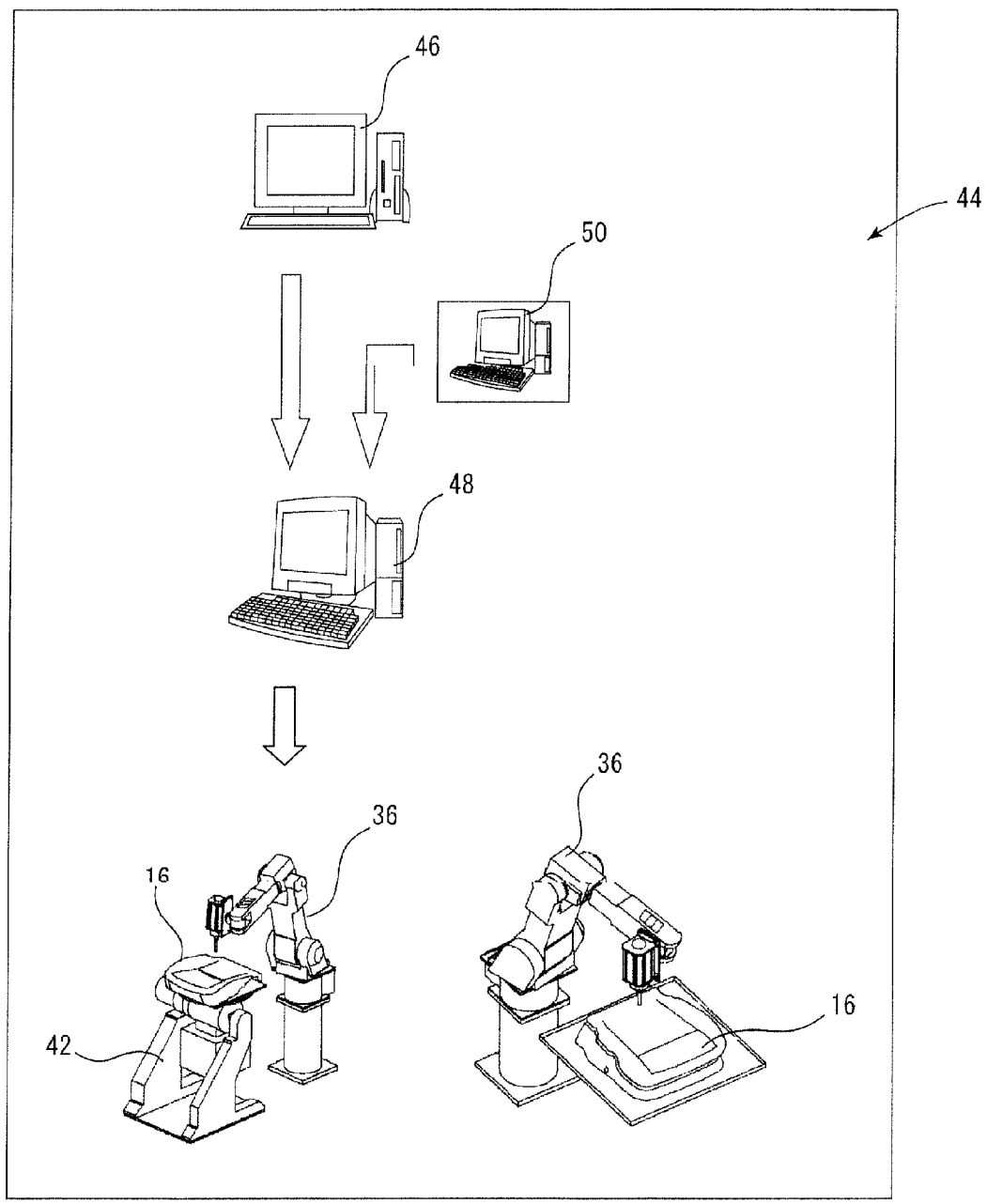
FIG. 16 is a block diagram illustrating an embodiment of an NC processing system used in the casting die producing method of the present invention.

FIG. 13 is a flowchart illustrating a step order in the casting die producing method according to a second aspect of the present invention. FIG. 14 is a perspective view of an embodiment of a processing robot used in the casting die producing method of the present invention. FIG. 15 is an enlarged sectional view of an essential portion of FIG. 14. FIG. 16 is a block diagram illustrating an embodiment of an NC processing system used in the casting die producing method of the present invention.

In the following, an example of the step order in the casting die producing method according to the first aspect of the present invention is described with reference to FIGS. 1 through 12. The drawings illustrate a case where a casting die for producing a seat pad of an automobile for riding is produced; lower and upper dies are produced as a die. Since the lower and upper dies can be produced by the same process, FIGS. 3 through 5 and FIGS. 8 through 11 only illustrate the lower die, and FIGS. 2, 6, 7, and 12 only illustrate the configuration of the upper die.

The step order in the casting die producing method of the present invention is as follows:

(1) First, a die data is made through designing a requisite die in compliance with a configuration of an article to be produced (the die data making step, Step 100 of FIG. 1). Since a lower die and an upper die are produced as the die, lower die data 10 and upper die data 12 are made as illustrated in FIGS. 2 and 7. This step is usually referred to as CAD (Computer Aided Design).

(2) There are prepared processing data (FIGS. 3 and 8) as to how processing is to be performed by an automatic processing machine on the basis of the die (lower die) data;

(2) Based on the die data 10, there is prepared processing data (FIGS. 3 and 8) as to how processing is to be performed by an automatic processing machine 14A (an automatic processing preparation step, Step 102 of FIG. 1). As the automatic processing machine 14A, an NC processing machine (multi-axis) may be used. It is also possible to use a processing robot or the like as the automatic processing machine 14A. When the NC processing machine (multi-axis) or the processing robot is used as the automatic processing machine 14A, the processing data may be input to the automatic processing machine 14A for recording purpose. Alternatively, the processing data may be input to a controller so that the automatic processing machine 14A is operated on the basis of a computer program. This step is usually referred to as CAM (Computer Aided Manufacture).

(3) A die model 18 is produced by cutting a die model material 16 with the automatic processing machine 14A (a die model cutting step, Step 104 of FIG. 1). As the die model material 16, it is desirable to use a plastic foam material, such as a polyurethane foam material or a polystyrene foam material. The cutting by the automatic processing machine 14A includes inner surface processing in which cutting is performed on an inner surface 18a of the die model 18 as illustrated in FIGS. 3(a) and 8(a) and outer surface processing in which cutting is performed on an outer surface 18b of the die model 18 as illustrated in FIGS. 3(b) and 8(b). The die model 18 obtained is an integrated body (one piece), and does not need to be divided unlike the prior art.

(4) As illustrated in FIG. 4, a die mold 26 is made by packing casting sand 22 in a box 20 whose upper side is open, with the die model 18 produced in the die model cutting step being placed at the central part of the box 20, the casting sand 22 being provided with a gate 24 and solidified with bond to thereby obtain the die mold 26 (a die mold making step, Step 106 of FIG. 1).

(5) As illustrated in FIG. 5, a die (a lower die) 30 is cast by pouring a molten die material (molten metal) 28 into the die mold 26 made in the die mold making step via the gate 24 (a die casting step, Step 108 of FIG. 1). Molten aluminum is used as the molten die material (molten metal). FIG. 6 illustrates the cast die (lower die) 30. FIG. 6 also illustrates an upper die 32, which is produced by the same production procedures as those for the lower die 30, and hence repetitive explanation thereof is omitted to avoid duplication. The casting method described in the above-mentioned items (4) and (5) is based on the lost-form casting (LFC) method or the full mold casting method.

In the case where the casting is effected by the lost-form casting method or the full mold casting method, a plastic foaming material that is meltable and pyrolyzable is used as the die model material 16 such that when the molten die material (molten metal) 28 is poured into the die mold 26 (the die casting step, Step 108 of FIG. 1), the die model 18 may be pyrolyzed to undergo displacement vanishing (evaporation vanishing) for the preparation of the die mold 26. When, for example, aluminum alloy is used as the die material (molten metal) 28, it is necessary to use polystyrene foam which is melted by the molten aluminum metal and can undergo evaporation vanishing.

FIGS. 9 through 11 illustrate the case where a usual sand mold casting method is performed. In this case, as the die model material 16, there is used a plastic foam material which does not undergo evaporation vanishing even when the molten die material (molten metal) is poured therein. In the case in which aluminum alloy, for example, is used as the die material (molten metal) 28, there is used a polyurethane foam which does not undergo evaporation vanishing by the molten aluminum alloy.

(4') As illustrated in FIG. 9, the casting sand 22 is packed in the box 20 with the die model 18 produced by the die model cutting step being placed at the central part of the box 20. The die model 18 is not vanished even when the molten die material (molten metal) 28 is poured therein. In this context, prior to pouring the molten die material (molten metal) 28, the die model 18 is taken out and as illustrated in FIG. 10, a hollow portion 34 is formed and a gate is provided, thus forming the die mold 26 through solidification with bond (the die mold making step, Step 106 of FIG. 1).

(5') As illustrated in FIG. 11, the molten die material (molten metal) 28 is poured into the die mold 26 prepared in the die mold making step via the gate 24 to cast the die (lower die) 30 (the die casting step, Step 108 of FIG. 1). Molten aluminum is used as the molten die material (molten metal). FIG. 12 illustrates the cast die (lower die) 30. FIG. 12 also illustrates an upper die 32, which is produced by the same production procedures as those for the lower die 30, and hence repetitive explanation thereof is omitted to avoid duplication.

(6) The die (lower die) 30 cast in the die casting step is finished and assembled together with the upper die produced in a similar fashion (a finishing and assembling step, Step 110 of FIG. 1). In this way, the casting die (aluminum casting) is completed.

Next, an example of the step order in the casting die producing method according to the second aspect of the present invention is described with reference to FIGS. 13 through 16. In the casting die producing method according to the second aspect of the present invention, after the automatic processing preparation step (Step 102) illustrated in FIG. 1, there is further provided a robot data conversion step (Step 103) wherein the processing data are converted into robot operation data. This example is basically the same as the first aspect described above except that the automatic processing machine is a processing robot.

As in the first aspect, (1) first, a die data is made through designing a requisite die in compliance with a configuration of an article to be produced (a die data making step, Step 100 of FIG. 13). Since a lower die and an upper die are produced as the die, lower die data 10 and upper die data 12 are made as illustrated in FIGS. 2 and 7. This step is usually referred to as CAD (Computer Aided Design).

(2) Based on the die (lower die) data 10, there are prepared processing data (FIGS. 3 and 8) as to how processing is to be performed by a processing robot serving as an automatic processing machine 14A (an automatic processing preparation step, Step 102 of FIG. 13). This step is usually referred to as CAM (Computer Aided Manufacture).

The processing robot may be an industrial robot capable of severing and cutting, that is, a manipulator having a degree of freedom of three axes or more and allowing automatic control and programming. In particular, a multi-axes (e.g., 6-axes) industrial robot capable of three-dimensional severing and three-dimensional cutting can be suitably employed. As the processing robot 36, it is possible to use, for example, Kawasaki Robot FS 30L manufactured by Kawasaki Heavy Industries, Ltd.

FIGS. 14 and 15 illustrate an embodiment of the processing robot used in the casting die producing method of the present invention. In FIGS. 14 and 15, numeral 36 represents a processing robot serving as the automatic processing machine 14B. The processing robot 36 which is a processing robot provided with a teaching playback function has a multi-axes arm 38 with joints each of which is capable of assuming various angles and a drill 40 provided at the forward end of the multi-axes arm. Regarding the drill, it is preferable to use several different kinds of drills according to the purpose such as severing or cutting. Numeral 42 represents a placing stand on which the die model material 16 is placed.

(2A) Then the processing data are converted into robot operation data (a robot data conversion step, Step 103 of FIG. 13). In this step, the processing data are converted into the robot operation data for teaching operation to the robot such that the processing robot 36 may operate automatically. It is possible to input the robot operation data into the processing robot 36 for recording purposes, or to input the robot operation data into a controller so that the processing robot 36 is operated by a computer program. In this step, there are performed, for example, CAD information reading, pass preparation, NC data output, robot simulation, editing of teaching, operation program output, etc.

(3) A die model 18 is produced by cutting a die model material 16 with the automatic processing machine 14B (a die model cutting step, Step 104 of FIG. 13). As the die model material 16, it is desirable to use a plastic foam material, such as a polyurethane foam material or a polystyrene foam material. The cutting by the automatic processing machine 14B includes inner surface processing in which cutting is performed on an inner surface 18a of the die model 18 as illustrated in FIGS. 3(a) and 8(a) and outer surface processing in which cutting is performed on an outer surface 18b of the die model 18 as illustrated in FIGS. 3(b) and 8(b). The die model 18 obtained is an integrated body (one piece), and does not need to be divided unlike the prior art.

(4-6) Next, steps similar to those of Steps 106 through 110 of FIG. 1 are performed in FIG. 13 to complete a casting die.

Steps 106 through 110 of FIG. 13 are similar to those described above, and hence repetitive explanation thereof is omitted.

FIG. 16 illustrates an embodiment of an NC processing system used in the casting die producing method of the present invention. In FIG. 16, an NC processing system 44 includes a CAD apparatus 46 for performing Steps 100 and 102, a robot data converting apparatus 48 for performing Step 103, and a processing robot 36 for performing the three-dimensional severing and three-dimensional cutting in Step 104. Further, this robot data converting apparatus is provided with a CAM data import apparatus 50 so that CAM data (NC data) from other apparatuses can be read.

In FIG. 16, in the CAD apparatus 46, die design, severing/cutting trimming line setting, etc. are performed. In the robot data converting apparatus 48, there are performed reading of CAD information, pass generation, NC data output, robot simulation, editing of robot teaching, robot operation programming, etc. In the case of CAM data (NC data) from other apparatuses, data reading is performed by the CAM data import apparatus 50, and the data is transmitted to the robot data converting apparatus 48. On the basis of the data thus prepared, the processing robot 36 performs three-dimensional cutting (three-dimensional milling) of the die model material 16.

As the CAD apparatus 46, the robot data converting apparatus 48, and the CAM data import apparatus 50, there may be used computers with commercially available software incorporated therein.

The casting die (lower die and upper die) 30, 32 is produced as described above; regarding the requisite working days for the production, (1) the die data making step requires one working day, the automatic processing preparation step takes one working day, the die model cutting step takes two working days, the die mold making step takes one working day, the die casting step takes one working day, and the finishing and assembling step takes one working day, which means the whole steps are completed in seven working days in total. According to the method of the present invention, it is possible to substantially shorten the requisite working days as compared with the conventional method. Further, the casting die produced by the method of the present invention exhibits a very high precision.

The invention claimed is:

1. A method for producing a casting die for a seat pad, the method comprising:
    a die data making step for making die data through designing a requisite die comprising a lower die portion and an upper die portion in compliance with a configuration of a seat pad as an article to be produced;
    an automatic processing preparation step for preparing processing data as to how processing is to be performed by a processing robot as an automatic processing machine on the basis of the die data;
    a robot data conversion step for converting said processing data into robot operation data;
    a die model cutting step for producing a lower cast die model and an upper cast die model by cutting a die model material with said processing robot based on said robot operation data, said die model material comprising polystyrene foam, said polystyrene foam being meltable by a molten aluminum alloy and capable of undergoing evaporation vanishing;
    a lower die mold making step for making a lower die mold by packing casting sand in a box whose upper side is open, with the lower cast die model produced in the die model cutting step being placed at a central part of the box, the casting sand being provided with a gate and solidified with bond to thereby obtain the lower die mold;
    an upper die mold making step for making an upper die mold by packing casting sand in a box whose upper side is open, with said upper die model produced in the die model cutting step being placed at a central part of the box, said casting sand being provided with a gate and solidified with bond to thereby obtain the upper die mold;
    a lower die portion casting step for casting said lower die portion by a lost-form casting method, pouring said molten aluminum alloy as a molten die material into the lower die mold made in the lower die mold making step;
    an upper die portion casting step for casting said upper die portion by said lost-form casting method, pouring said molten aluminum alloy as a molten die material into said upper die mold made in said upper die mold making step;
    a finishing and assembling step for finishing and assembling the die cast in the lower die portion casting step and the upper die portion casting step.

2. A method for producing a casting die for a seat pad, the method comprising:
    generating die data corresponding to a lower die portion and an upper die portion for forming a seat pad;
    providing a processing robot;
    preparing processing data based on said die data;
    converting said processing data into robot operation data;
    providing a die model material comprising a meltable and evaporation vanishing polystyrene foam;
    cutting said die model material with said processing robot based on said robot operation data to form a lower cast die model and an upper cast die model;
    providing a molten aluminum alloy;
    providing a first gate;
    providing a first casting sand;
    providing a first box comprising a first box open side;
    packing said first casting sand in said first box;
    placing said lower cast die model in a central portion of said first box, wherein said first casting sand surrounds said lower cast die model;
    solidifying said first casting sand with to form a lower die mold;
    providing a second casting sand;
    providing a second box comprising a second box open side;
    placing said upper cast die model in a central portion of said second box, wherein said second casting sand surrounds said upper cast die model;
    solidifying said second casting sand with to form an upper die mold;
    casting said lower die portion via a lost-form casting method to form said lower die portion, wherein said molten aluminum alloy is poured into said lower die mold via said first gate;
    casting said upper die portion via said lost-form casting method to form said upper die portion, wherein said molten aluminum alloy is poured into said upper die mold via said second gate;
    assembling said lower die portion and said upper die portion to form an assembled seat pad molding die.

3. A method in accordance with claim 2, further comprising:
    forming said seat pad with said assembled seat pad molding die.

4. A method for producing a casting die for a seat pad, the method comprising:

generating die data corresponding to a lower die portion and an upper die portion for forming a seat pad;

providing a processing robot;

preparing processing data based on said die data;

converting said processing data into robot operation data;

providing a die model material comprising a meltable and evaporation vanishing polystyrene foam;

cutting said die model material with said processing robot based on said robot operation data to form a lower cast die model and an upper cast die model;

providing a molten aluminum alloy;

providing a gate;

providing a casting sand;

providing a box comprising an open side;

packing said casting sand in said box;

placing said lower cast die model in a central portion of said box, wherein said casting sand surrounds said lower cast die model;

solidifying said casting sand to form a lower die mold;

casting said lower die portion via a lost-form casting method to form said lower die portion, wherein said molten aluminum alloy is poured into said lower die mold via said gate;

removing said lower die portion from said box;

placing said upper cast die model in a central portion of said box after removing said cast lower die portion from said box, wherein said casting sand surrounds said upper cast die model;

solidifying said casting sand to form an upper die mold;

casting said upper die portion via said lost-form casting method to form said upper die portion, wherein said molten aluminum alloy is poured into said upper die mold via said gate;

removing said upper die portion from said box;

assembling said lower die portion and said upper die portion to form an assembled seat pad molding die.

5. A method in accordance with claim 4, further comprising:

forming said seat pad with said assembled seat pad molding die.

* * * * *